(12) United States Patent
Hadden et al.

(10) Patent No.: US 12,628,977 B2
(45) Date of Patent: May 19, 2026

(54) BEVERAGE MACHINE USER INTERFACE

(71) Applicant: Keurig Green Mountain, Inc., Burlington, MA (US)

(72) Inventors: Jeffrey Sol Hadden, Arlington, MA (US); Lisa Fortini Watts, Medford, MA (US); Mustafa Kamal Ahmed, Arlington, MA (US); Haniel Olivera, Fitchburg, MA (US); Ilya Tatar, Reading, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 1082 days.

(21) Appl. No.: 17/640,479

(22) PCT Filed: Sep. 21, 2020

(86) PCT No.: PCT/US2020/051764
§ 371 (c)(1),
(2) Date: Mar. 4, 2022

(87) PCT Pub. No.: WO2021/061558
PCT Pub. Date: Apr. 1, 2021

(65) Prior Publication Data
US 2022/0330744 A1     Oct. 20, 2022

Related U.S. Application Data

(60) Provisional application No. 62/904,812, filed on Sep. 24, 2019.

(51) Int. Cl.
*A47J 31/52*          (2006.01)

(52) U.S. Cl.
CPC ........... *A47J 31/525* (2018.08); *A47J 31/521* (2018.08)

(58) Field of Classification Search
CPC ........ A47J 31/525; A47J 31/521; A47J 31/02; A47J 31/4482; A47J 31/4485; A47J 31/60;
(Continued)

(56) References Cited

U.S. PATENT DOCUMENTS 9,245,402 B2     1/2016  Green et al.
9,691,202 B2     6/2017  Schuster
(Continued)

FOREIGN PATENT DOCUMENTS

WO     WO 2013/150091 A1     10/2013
WO     WO 2017/085073 A1      5/2017
WO     WO 2019/166470 A1      9/2019

OTHER PUBLICATIONS

International Search Report and Written Opinion mailed Dec. 4, 2020, in connection with International Application No. PCT/US2020/051764.

(Continued)

*Primary Examiner* — Phuong T Nguyen
(74) *Attorney, Agent, or Firm* — Wolf, Greenfield & Sacks, P.C.

(57) ABSTRACT

A beverage forming system having a controller arranged to provide a user interface with a user-adjustable indication of at least one brew parameter and to receive a command from a user to adjust the at least one brew parameter. The user-adjustable indication may include a slider track extending between the maximum and minimum values for a brew parameter and a slider element movable along the slider track where a position of the slider element on the slider track indicates a set value for the brew parameter. The controller may limit a command from the user to adjust the brew parameter to be between a minimum value for the brew parameter and a limited value that is below a maximum (Continued)

value for the brew parameter, or between a limited value that is above the minimum value and the maximum value for the brew parameter.

17 Claims, 11 Drawing Sheets

(58) Field of Classification Search
CPC ........ A47J 31/469; A47J 31/061; A47J 45/10;
A47J 36/10
USPC ............................ 99/279, 290, 293, 295, 323
See application file for complete search history.

(56)                       References Cited

U.S. PATENT DOCUMENTS

| | | | |
|---|---|---|---|
| 9,980,596 | B2 | 5/2018 | Rognon et al. |
| 10,158,721 | B2 | 12/2018 | Jarnagin, III |
| 10,899,595 | B2 | 1/2021 | Cuppari |
| 11,026,538 | B2 | 6/2021 | Stasch et al. |
| 11,026,540 | B2 | 6/2021 | Mathure et al. |
| 2010/0289807 | A1* | 11/2010 | Yu ........................ G06F 3/04847 |
| | | | 345/173 |
| 2012/0295234 | A1* | 11/2012 | Rognon .............. A47J 31/3623 |
| | | | 434/127 |
| 2017/0099981 | A1 | 4/2017 | Haidar et al. |
| 2018/0325306 | A1 | 11/2018 | Mathure et al. |
| 2019/0045968 | A1 | 2/2019 | Hartmann et al. |
| 2020/0031656 | A1 | 1/2020 | Rudick et al. |
| 2020/0085233 | A1 | 3/2020 | Hartmann et al. |
| 2020/0098218 | A1 | 3/2020 | Hartmann et al. |
| 2021/0000290 | A1* | 1/2021 | Savioz ................. G06F 3/0362 |

OTHER PUBLICATIONS

International Preliminary Report on Patentability mailed Mar. 15, 2022, in connection with International Application No. PCT/US2020/051764.

* cited by examiner

Green Mountain Coffee Roasters

BEVERAGE MACHINE USER INTERFACE

CROSS REFERENCE TO RELATED APPLICATION

This application is a national stage filing under 35 U.S.C. § 371 of International Patent Application No. PCT/US2020/051764, filed Sep. 21, 2020, which claims the benefit of U.S. Provisional Application No. 62/904,812, filed Sep. 24, 2019. The contents of these applications are hereby incorporated by reference in their entireties.

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Patent Application publication 2008/0134902 discloses a beverage forming system that heats water in a reservoir and pneumatically delivers the heated water to a brew chamber for making a coffee drink or other beverage. U.S. Pat. No. 7,398,726 discloses another beverage forming system that delivers heated water from a dispensing tank to a brew chamber by pneumatic forcing of the water from the metering tank. U.S. Patent Application publications 2009/0120299 and 2008/0092746, and U.S. Pat. Nos. 3,511,166, 3,958,502, 4,602,145, 4,263,498 and 8,037,811 disclose other system types in which water in a heater tank or heat exchanger is forced to flow out of the tank and to a beverage making station by introducing unheated water into the tank/exchanger.

SUMMARY OF INVENTION

In one aspect, a beverage forming system includes a liquid supply arranged to provide a liquid for forming a beverage, a beverage forming station arranged to hold a beverage material for mixing with the liquid to form a beverage, and a liquid conditioner arranged to heat or cool the liquid that is provided to the beverage forming station. A control circuit may be arranged to control the liquid supply and the liquid conditioner to operate automatically according to one or more brew parameters during a dispensing operation to deliver heated or cooled liquid to the beverage forming station to form the beverage. In one embodiment, the control circuit includes a user interface arranged to provide a user-adjustable indication of at least one brew parameter and to receive a command from a user to adjust the at least one brew parameter. The control circuit may be adapted to limit the command from the user to adjust the at least one brew parameter to be between a minimum value for the at least one brew parameter and a limited value that is below a maximum value for the at least one brew parameter, or between a limited value that is above the minimum value and the maximum value for the at least one brew parameter. Such limitation on a user's ability to adjust a brew parameter may be useful in a variety of different applications, such as where a beverage pod is not capable of withstanding temperatures above threshold level and/or a beverage pod has ingredients that cannot be used to form a beverage unless mixed with liquid above a threshold temperature. In such a case, the control circuit may limit a user's ability to adjust a beverage temperature to be no more than, or less than, a threshold temperature. While temperature is referred to here as an example, other brew parameters may have similar limits placed on user adjustment as discussed below.

In one embodiment, the control circuit is adapted to provide an indication of the maximum value or the minimum value for the at least one brew parameter along with an indication of the limited value. For example, the control circuit may display information, such as a number, icon and/or text, corresponding to the maximum or minimum value as well as the limited value. This may help a user understand the range or other values to which a parameter may be set.

The control circuit may determine a limited value for a brew parameter in different ways. For example, the beverage forming station may be adapted to receive a beverage capsule containing the beverage material, and the control circuit may be adapted to identify at least one characteristic of the beverage capsule received by the beverage forming station and determine the limited value based on the at least one characteristic of the beverage capsule. The at least one characteristic of the beverage capsule may be one of a type of beverage to be formed using the beverage capsule, authentication information associated with the beverage capsule, and information regarding the beverage material in the beverage capsule, as a few examples.

The user adjustable indication for a brew parameter may be arranged in different ways, e.g., may be displayed on a touch screen interface. For example, the user-adjustable indication may include a slider track extending between the maximum and minimum values for the at least one brew parameter and a slider element movable along the slider track where a position of the slider element on the slider track indicates a set value for the at least one brew parameter. The indication of the limited value may include a marking along the slider track between the maximum and minimum values, and the slider element may not be movable to an area between the marking and the maximum value or between the marking and the minimum value. In some cases, the control circuit may determine a default setting for the at least one brew parameter based on the at least one characteristic of the beverage capsule or in other ways, and the user-adjustable indication may include a display of the default setting for the at least one brew parameter. For example, where the user-adjustable indication includes a slider track extending between the maximum and minimum values and a slider element movable along the slider track, the slider element may be located on the slider track in a position corresponding to the default setting for the at least one brew parameter.

In some embodiments, the at least one brew parameter subject to a limited value includes a volume of beverage to be dispensed, a temperature of the beverage, a strength of the beverage, an amount of whipping of the beverage, a time period over which the beverage is dispensed, a speed at which the beverage is dispensed, a flow rate at which liquid is delivered to the beverage forming station, a pressure of liquid delivered to the beverage forming station, and/or an amount of air or steam delivered to the beverage forming station. Of course, a beverage machine may use multiple brew parameters to form a beverage and the user interface may include a user-adjustable indication for at least two brew parameters, such as volume of beverage to be dispensed, a temperature of the beverage, and/or a strength of the beverage.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. For example, aspects of the invention are described with reference to a specific user interface arrangement, but aspects of the invention are not limited to the user interface arrangements described herein. Thus, aspects of the invention are not intended to be construed narrowly in view of the illustrative embodiments. In addition, it should be understood that aspects of the invention may be used alone or in any suitable combination with other aspects of the invention.

Figure 1:
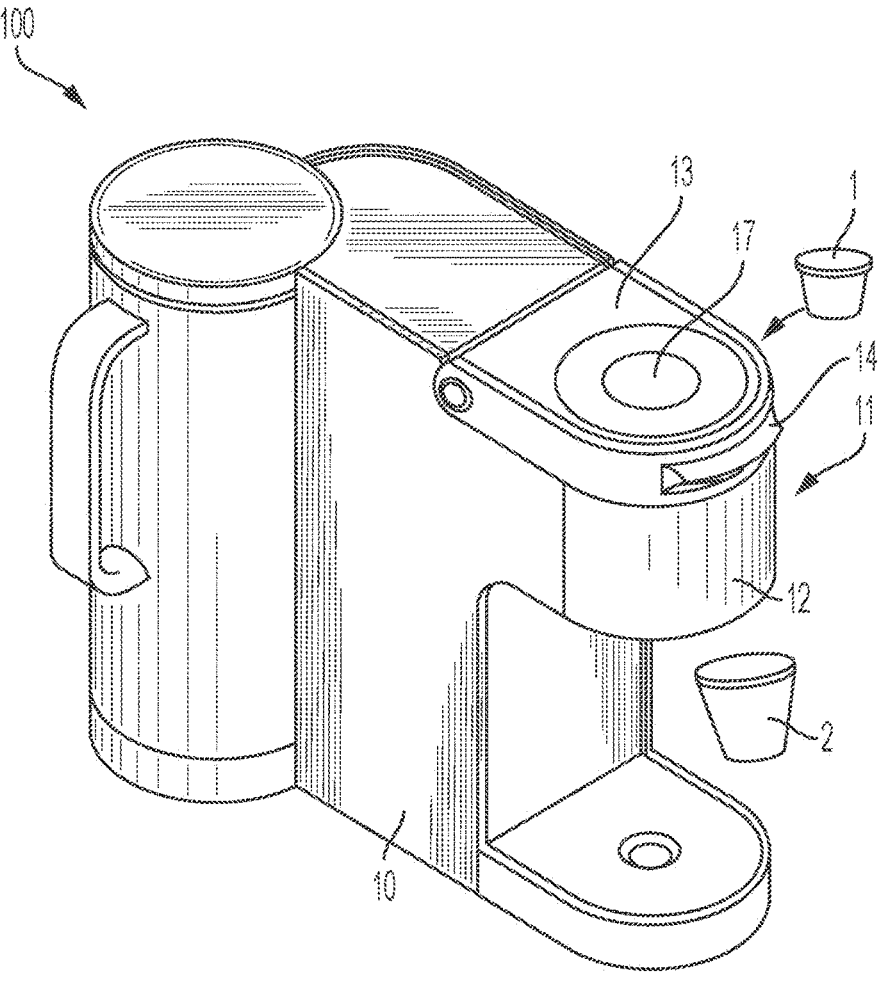
FIG. 1 is a perspective view of a beverage machine with user interface located at a beverage forming station in an illustrative embodiment.

FIG. 1 shows a perspective view of a beverage machine 100 in an illustrative embodiment that incorporates aspects of the invention. For purposes herein, the beverage machine 100 may be used to form any suitable beverage, such as tea, coffee, other infusion-type beverages, carbonated beverages, beverages formed from a liquid or powdered concentrate, soups, juices or other beverages made from dried materials, or others. As will be appreciated, the beverage machine may produce hot and/or cold beverages. In the illustrative embodiment of FIG. 1, the machine 100 is arranged to form coffee or tea beverages (e.g., as a beverage brewer). As is known in the art, a beverage capsule, such as beverage capsule 1, may be provided to the machine 100 and used to form a beverage that is deposited into a container 2, such as a user's cup, carafe or other. The capsule 1 may be manually or automatically provided to a beverage forming station 11 of the beverage machine 100. For example, the beverage forming station 11 may include a capsule holder 12 that is exposed to receive the capsule 1 when the user (or machine controller) operates a handle or other actuator 14 to open the forming station 11, e.g., by moving a lid or other cover 13 with respect to the capsule holder 12. With the capsule 1 placed in the capsule holder 12, the capsule holder 12 and lid 13 may be moved relative to each other to at least partially enclose the capsule 1, e.g., so that water or other precursor liquid can be introduced into the capsule 1 to form a beverage. For example, with the capsule 1 held in the beverage forming station 11, the capsule 1 may be pierced to form inlet and outlet openings through which water or other precursor liquid enters the capsule 1 and beverage exits the capsule 1, respectively. U.S. Pat. No. 8,361,527 describes a capsule and a system for introducing liquid into the capsule that may be used in an embodiment of this invention, and is hereby incorporated by reference in its entirety.

A user may receive information from, and/or provide information to, the beverage machine 100 via a user interface 17, which may include a display, buttons, switches, touch screen and/or other elements for information display and reception. As described in more detail below, the user interface 17 may be interacted with by a user to adjust one or more brew parameters used by the machine 100 to form a beverage. Such parameters may include a beverage volume, temperature, strength, time period, carbonation level, etc. Adjusting a "strength" of a beverage may be performed in different ways, such as using additional beverage material to form a beverage than a standard amount, using less water to form a beverage than a standard amount, using a higher water or steam pressure to form a beverage than a standard level (e.g., espresso coffee is made using higher pressure water or steam than drip-type coffee), and others. In the illustrative embodiment below, adjusting the "strength" of a beverage is done by adjusting a flow rate of water to the beverage forming station: a slower flow rate provides longer contact time between water and beverage material, thereby increasing a "strength" of the beverage dispensed. In some cases, at least default settings for brew parameters may be determined by a controller based on at least one characteristic identified from a capsule 1 that is to be used to form a beverage.

Figure 2:
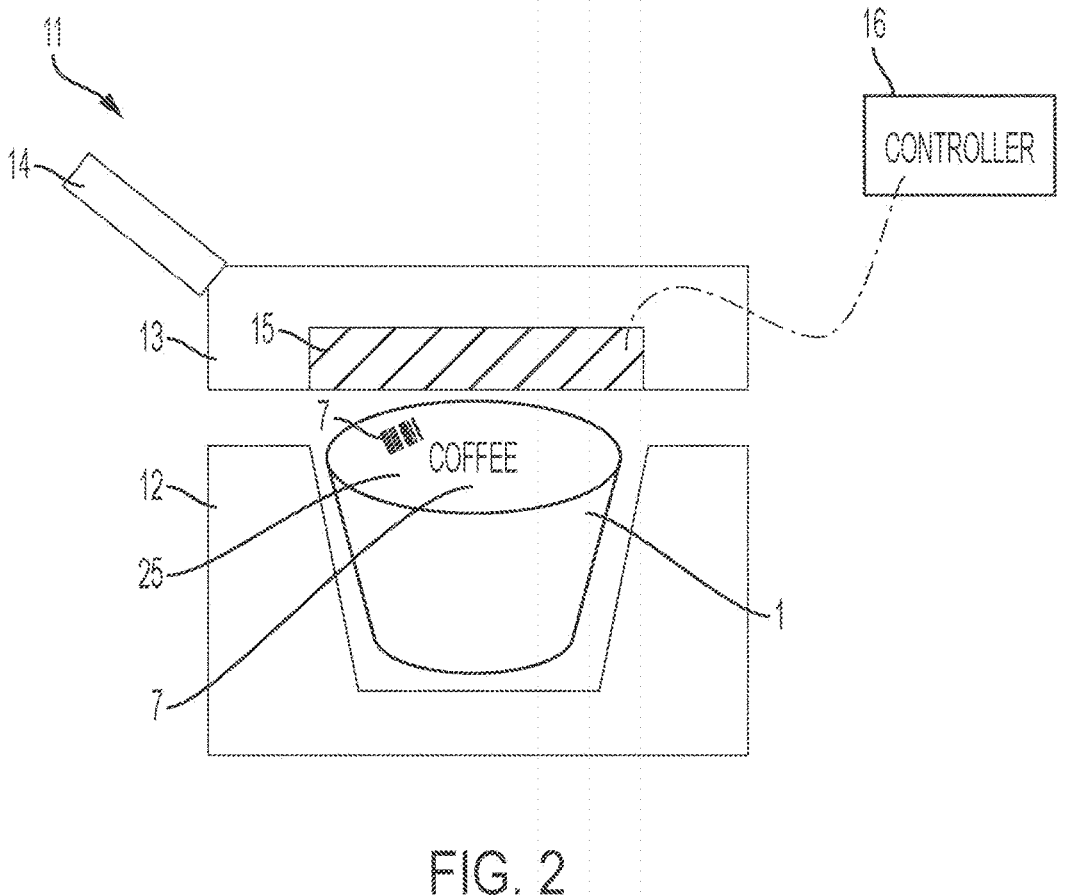
FIG. 2 is a schematic view of the beverage forming station in the FIG. 1 embodiment showing a capsule reading system.

In some cases, a characteristic of a capsule 1 may be identified by reading a feature of the capsule 1. For example, as shown schematically in FIG. 2, the beverage forming station 11 includes a reading device 15 arranged to capture an image of a portion of the capsule 1 or otherwise read a characteristic of the capsule 1. In some cases, the capsule may include one or more machine readable indicia 7 such as alphanumeric text, a barcode (e.g., a 2D or 3D barcode), RFID tag, inductive element, magnetic strip or other element, optically sensed element (e.g., visible or invisible text, graphics, color), physical structures or other indicia arranged to indicate a characteristic of the capsule. Characteristics indicated by indicia 7 on the capsule 1 may include a manufacturer name or location, a brand name or logo, a type of beverage ingredient in the capsule or beverage to be made using the capsule, instructions and/or machine settings for use in preparing a beverage using the capsule, an authentication code or other information that permits the machine 100 to operate using the capsule, etc. In some embodiments, as shown in FIG. 2, an imaging device 15 is mounted to the lid 13 of the beverage forming station 11 and is arranged to capture an image of a portion of a top or lid 25 of the capsule 1. Of course, other portions of a capsule may be imaged or otherwise read, and the portion that is imaged need not necessarily include indicia 7. An image captured by the imaging device 15 may include one or more indicia 7 on the capsule 1, e.g., an image may include both text and a barcode on the lid 25 of the capsule as shown in FIG. 2. In some embodiments, the imaging device 15 may capture an image of the entire lid 25 of the capsule 1. The imaging device 15 may be arranged to capture two or more images of a portion of the capsule 1, such as by scanning across the lid 25 of the capsule, and the imaging device 15 may include two or more image sensors, such as a camera or other image sensor for visible light, infrared light, ultraviolet light, or other electromagnetic radiation. Multiple sensors may be employed to image an area of the capsule 1, e.g., images captured by multiple sensors may be stitched together to form a single image or otherwise used. The imaging device 15 may include illumination devices, such as one or more LEDs or other devices to illuminate a portion of the capsule 1 that is imaged. Such illumination devices may be positioned in any suitable way, e.g., to illuminate a portion of the capsule 1 so a desired image of the capsule portion can be captured. Illumination may be useful when imaging in dark areas or otherwise in low levels of ambient light, and/or to cause indicia 7 or other features on the capsule 1 to emit a detectable signature. For example, the capsule 1 may include fluorescent paint or other elements that emit a visible or other light when illuminated by a particular wavelength or set of wavelengths. The imaging device 15 may thus excite such features by way of an illumination device and capture an image of the light emitted by the capsule 1 in response. The imaging device 15 may include a photocell or other light level sensor to detect whether an illumination device should be operated, e.g., a capsule portion may be illuminated if ambient light levels are below a threshold. The imaging device 15 may include other optical components as well, such as one or more lenses, light diffusers, filters, reflectors, light pipes, etc. whether used to illuminate the capsule portion or to receive and transmit imaging light.

As shown in FIG. 2, the imaging device 15 is operatively coupled to a controller 16 which includes control circuitry adapted to control operation of the imaging device 15, receive image data from the imaging device 15, perform image processing, decoding or other operations on the image data, and/or control other components of the beverage machine 100. In some embodiments, the controller 16 activates the imaging device 15 to capture an image of at least a portion of the capsule when the capsule is in the capsule holder 12, e.g., so the controller 16 can determine a set of default settings for brew parameters to be used to form a beverage using the capsule 1. In some embodiments, the imaging device 15 captures an image of the capsule as parts of the beverage forming station 11 move relative to each other to at least partially enclose the capsule. For example, an image may be captured when a user interacts with the actuator 14 to move the lid 13 from an open position to a closed position with respect to the capsule holder 12.

In some embodiments, the controller 16 may activate the imaging device 15 to capture the image according to a trigger mechanism or trigger criterion. In some embodiments, a trigger mechanism may detect the closing of the forming station 11 and in response the controller 16 may control the imaging device 15 to capture an image of at least a portion of the capsule 1. By capturing an image of the capsule 1 as the capsule 1 is being enclosed at the forming station 11, the controller 16 can ensure that the imaged capsule 1 corresponds to the capsule subsequently used to form a beverage, or even allow the controller 16 to detect that no capsule 1 is present in a capsule holder 12. For example, if a capsule 1 is imaged before movement begins at the forming station 11 to enclose the capsule 1, it is possible that a user may replace the imaged capsule 1 with another and then close the forming station 11. In this case, the controller 16 will not have an image of the capsule 1 that was actually used to form the beverage. In contrast, by imaging the capsule 1 as the capsule 1 is being enclosed by the forming station 11 (e.g., as the capsule holder 12 and lid 13—or other forming station parts—are being moved relative to each other from an open position to a closed position), the controller 16 can better ensure that the captured image properly corresponds to the capsule used to subsequently form a beverage. In addition, imaging the capsule as one or more parts of the forming station 11 are moved to enclose a capsule 1 allows the controller 16 to receive image data before the forming station 11 is closed. This allows the controller 16 to take suitable action, e.g., decoding image data, presenting brew options to a user on the user interface 17, etc., before or shortly after the forming station 11 is closed. This may reduce a wait time that a user may otherwise have to endure if the capsule 1 is imaged after the capsule is enclosed at the forming station 11. In some embodiments, the controller 16 may include one or more sensors to detect not only movement of forming station 11 parts toward a closed position, but also movement of the forming station 11 parts toward an open position. This can allow the controller 16, for example, to detect that a lid 13 is being moved toward a closed position and trigger the imaging device 15 to capture an image of a portion of the capsule, and if the controller 16 detects that the lid 13 moves toward an open position (e.g., allowing the capsule 1 to be removed before formation of a beverage), the controller 16 may discard the image data. By capturing and using only image data as a forming station 11 is being moved toward a closed position, the controller 16 can ensure that appropriate image data is corresponded with a subsequently formed beverage. (While this embodiment refers to imaging indicia 7 on a capsule, any suitable reading of indicia can be employed, such as electronically communicating with an RFID tag or other electronic device, sensing a mechanical code, etc.)

Figures 3, 4:
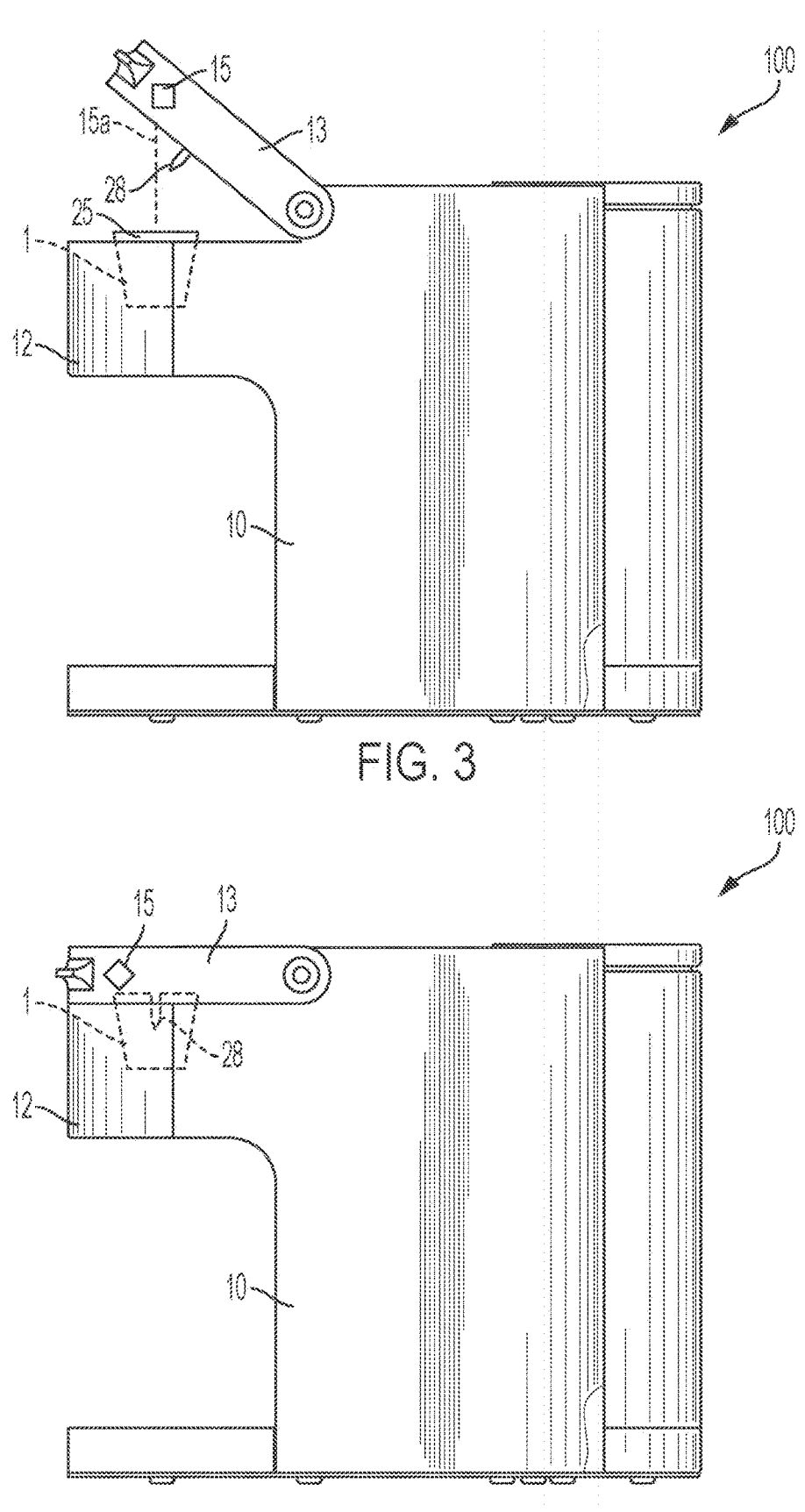
FIG. 3 is a side view of the FIG. 1 embodiment illustrating a point at which a capsule portion is imaged based on lid position.
FIG. 4 is a side view of the FIG. 1 embodiment showing the lid in a closed position.

FIG. 3 shows an arrangement in which an imaging device 15 is mounted to a lid 13 of the beverage forming station 11. The lid 13 is movable relative to the capsule holder 12 between open and closed positions. In this embodiment, the imaging device 15 has an optical sensor with an optical axis 15a that extends generally downward and away from the lid 13. The optical axis 15a is a general line along which the imaging device 15 receives optical information for capturing an image, e.g., a field of view. The imaging device 15 is arranged so that a best quality image of the capsule 1 is generally captured when the optical axis 15a is perpendicular to the lid 25 of the capsule 1. Thus, the controller 16 may control the imaging device 15 to capture an image of the capsule 1 when the optical axis 15a is perpendicular to the lid 25 of the capsule 1, as shown in FIG. 3. Determination of when the optical axis 15a is perpendicular to the lid 25 of the capsule 1 may be performed in different ways. For example, a trigger mechanism may include a sensor that detects when the lid 13 is at a particular angle relative to the remainder of the housing of the beverage machine 100 that corresponds to the optical axis 15a being oriented vertically. When the controller 16 determines that the lid 13 is at the particular angle (and optionally moving toward the closed position), the controller 16 may cause the imaging device 15 to capture an image of the capsule 1. The sensor may be a Hall effect sensor, potentiometer, encoder, an accelerometer or other suitable device to detect the position of the lid 13. Alternately, the sensor may detect a position of the imaging device 15 relative to the capsule 1, e.g., that the imaging device 15 is directly over the lid 25 of the capsule 1, which may trigger image capture. In another embodiment, the imaging device 15 may repeatedly capture image data as the lid 13 is being moved toward the closed position, and the controller 16 may determine which of the captured images includes a desired image of the capsule 1, e.g., by image analysis of the image data that reveals a particular image as including suitable characteristics indicative of a capsule lid 25. The position of the lid in FIG. 3 where the optical axis 15*a* is perpendicular to the lid 25 of the capsule 1 may be the open position (i.e., the farthest extent to which the lid 13 can be moved from the closed position) or may be between the open and closed positions. Thus, the imaging device 15 may be positioned at an optimal or otherwise desired position relative to a capsule to image a capsule when the lid 13 is at the open position, or the imaging device 15 may be better positioned for imaging the capsule when the lid 13 is somewhere between the open and closed positions. Note as well that although in this embodiment the imaging device 15 is arranged to capture a desired image of the capsule when the optical axis 15*a* is perpendicular to the capsule lid 25, this is not required in all embodiments. Instead, the imaging device 15 may be controlled to image the capsule when the optical axis 15*a* is at other angles relative to the capsule lid 25 or other capsule portion, such as in the closed position of the lid 13 as shown in FIG. 4. Also, triggering of the imaging device to capture an image of the capsule 1 need not have any relation to an optical axis of an image sensor, and the imaging device 15 need not have an optical axis at all. Instead, the imaging device 15 may capture an image of the capsule 1 for a particular position or range of relative positions of forming station 11 parts that receive a capsule 1, such as relative positions of a lid 13 and capsule holder 12.

With a capsule 1 received by the forming station 11, the beverage machine 100 can allow a user to instruct the machine 100 to go ahead with forming a beverage using the capsule 1. As an example, the controller 16 may cause the user interface 17 to display information like that shown in FIG. 5 to the user. The user interface 17 may include a brew button 171 (e.g., including a circular ring around a stylized "K" logo) on a touch screen that a user can press to cause the controller 16 to begin a brew cycle or other beverage dispensing process. In this embodiment, if the user presses the brew button 171, the controller 16 will cause the machine 100 to operate according to a set of brew parameters that were defined by default and which in this embodiment are summarized in a brew parameter settings menu 172. In this example, three brew parameter settings are summarized in the brew parameter settings menu 172, i.e., beverage volume, strength and temperature. While the strength and temperature settings are indicated in a qualitative sense, such settings could be indicated in a quantitative sense, e.g., as a level of total dissolved solids or turbidity for strength, or a temperature or temperature range for beverage temperature.

Sets of brew parameters used by the machine 100 may each have a corresponding name or label, and different sets of brew parameters may be selected by a user. For example, in this embodiment the default set of brew parameters selected by the controller 16 has the name "Recommended Brew" displayed in a parameter set menu 173. As indicated by the arrows "<" and ">" in the parameter set menu 173, a user may scroll left and right in the parameter set menu 173 to select between different sets of brew parameters. In this embodiment, the default set of brew parameters was selected by the controller 16 based on reading indicia 7 on a capsule 1 and based on a characteristic of the capsule 1 (such as a beverage type or name) determined from the indicia 7. For example, the capsule 1 may have indicia 7 that indicates a beverage type "dark roast coffee" and the controller 16 may correlate the beverage type "dark roast coffee" with the brew parameter settings shown in the menu 172 and indicate the corresponding label "Recommended Brew" in the menu 173. Such correlation may be done by referring to a lookup table, database or other information source stored in memory of the controller 16, stored remotely, or stored in indicia 7 of the capsule 1 and read by the controller 16. The user interface 17 may also allow a user to adjust one or more brew parameters using buttons 174, e.g., in this example, multiple buttons 174 are displayed indicating different beverage volumes that can be selected by a user by pressing the touch screen at the desired volume. In this example, the default setting for the beverage volume ("296 ml") is highlighted by an oval ring displayed around the button 174 for volume "296 ml," and other volumes can be selected by touching the desired volume number. Other brew parameter options than volume may be displayed so the user can make desired adjustments.

If a user wishes to adjust one or more brew parameters from the default settings for the brew parameters, the user may alternately press the brew parameter settings menu 172. In this example, pressing the brew parameter settings menu 172 may cause the user interface 17 to provide a user-adjustable indication 175 of at least one brew parameter, e.g., for brew parameters of beverage volume, beverage strength and beverage temperature as shown in FIG. 6. Each of the user-adjustable indications 175 provides the controller 16 with the ability to display a current (e.g., default) setting for a brew parameter to a user and to receive a command from the user to adjust the corresponding brew parameter so the controller 16 can use the adjusted brew parameter to form the beverage. In this example, each user-adjustable indication 175 includes a slider track 175*a* extending between maximum and minimum values for the brew parameter and a slider element 175*b* that is movable along the slider track 175*a* such that a position of the slider element 175*b* on the slider track 175*a* indicates a set value for the brew parameter. For example, if a user moves (by finger touch on the touch screen user interface 17 in FIG. 6) the slider element 175*b* corresponding to beverage volume (on the far left of FIG. 6) up or down along the slider track 175*a*, the beverage volume will be correspondingly adjusted up or down. The controller 16 may cause volume-related text and/or an icon (e.g., at the top of the slider track 175*a* in FIG. 6) to change in correspondence with the adjusted brew parameter setting, e.g., a smaller or larger beverage volume may be displayed along with an icon for a smaller or larger cup to indicate the change in the brew parameter. Other brew parameters may be similarly adjusted for beverage strength and/or temperature and/or other brew parameters. Pressing an "ok" button 176 (indicated by a ring around a check mark in FIG. 6) by the user can cause the controller 16 to accept any changes to the brew parameters, and cause the user interface to revert to a display like that in FIG. 5, although with adjusted brew parameters settings indicated in the brew parameter settings menu 172 and/or along with a corresponding name or label in the parameter set menu 173. Pressing a "favorites" button 177 (indicated by a ring around a heart in FIG. 6) can cause the controller 16 to save the brew parameter settings indicated for later selection and use. The controller 16 may provide the user with an option to save a corresponding name or label for the "favorites" set of brew parameters for selection and/or display in the parameter set menu 173. Pressing a "reset" button 178 (indicated by a ring around a pair of arcuate arrows in FIG. 6) can cause the controller 16 to reset the brew parameters to a default set of brew parameters or other set that was initially indicated on the user interface 17 prior to any user adjustment.

In some cases, one or more brew parameters may be limited to a value that is above a normal (or otherwise settable) minimum value or below a normal (or otherwise settable) maximum value for the parameter. In such a case, the controller 16 may be adapted to limit a command from the user to adjust the brew parameter to be a limited value that is below a maximum value for the brew parameter and/or above the minimum value for the brew parameter. As an example, the beverage machine 100 may be capable of dispensing beverage having a beverage volume of 4 ounces to 16 ounces. However, some capsules 1 may be arranged for use in forming a beverage with a maximum volume of no more than 12 ounces, or for forming a beverage with a minimum volume of no less than 10 ounces. In one case, a capsule 1 may contain an amount of beverage material arranged so that if a beverage is made having a volume that is more (or less) than a particular value, the beverage may be unacceptable to most consumers, e.g., because the beverage is too weak or strong. By limiting a user's ability to adjust a beverage volume to be no more, or less, than a limited value, a company associated with the capsule 1 and/or machine 100 may help ensure consumers are satisfied with beverages made using certain capsules. As another example, a capsule 1 may contain beverage materials that are intended to be mixed with water that is above (or below) a certain minimum (or maximum) temperature. Or, a capsule 1 may be made of a plastic or other material that can only withstand certain maximum temperatures. In one case, a capsule 1 may contain beverage materials intended for forming a cold or cool beverage, e.g., having a temperature of 100 degrees F. or less. Moreover, the capsule 1 may be made of plastic materials that are only capable of withstanding temperatures below 120 degrees F. because the capsule 1 is intended to make cold beverages. In this case, the controller may limit a user's ability to adjust a beverage temperature to be no more than a limited value, e.g., of 100 degrees F. or less.

Figure 6:
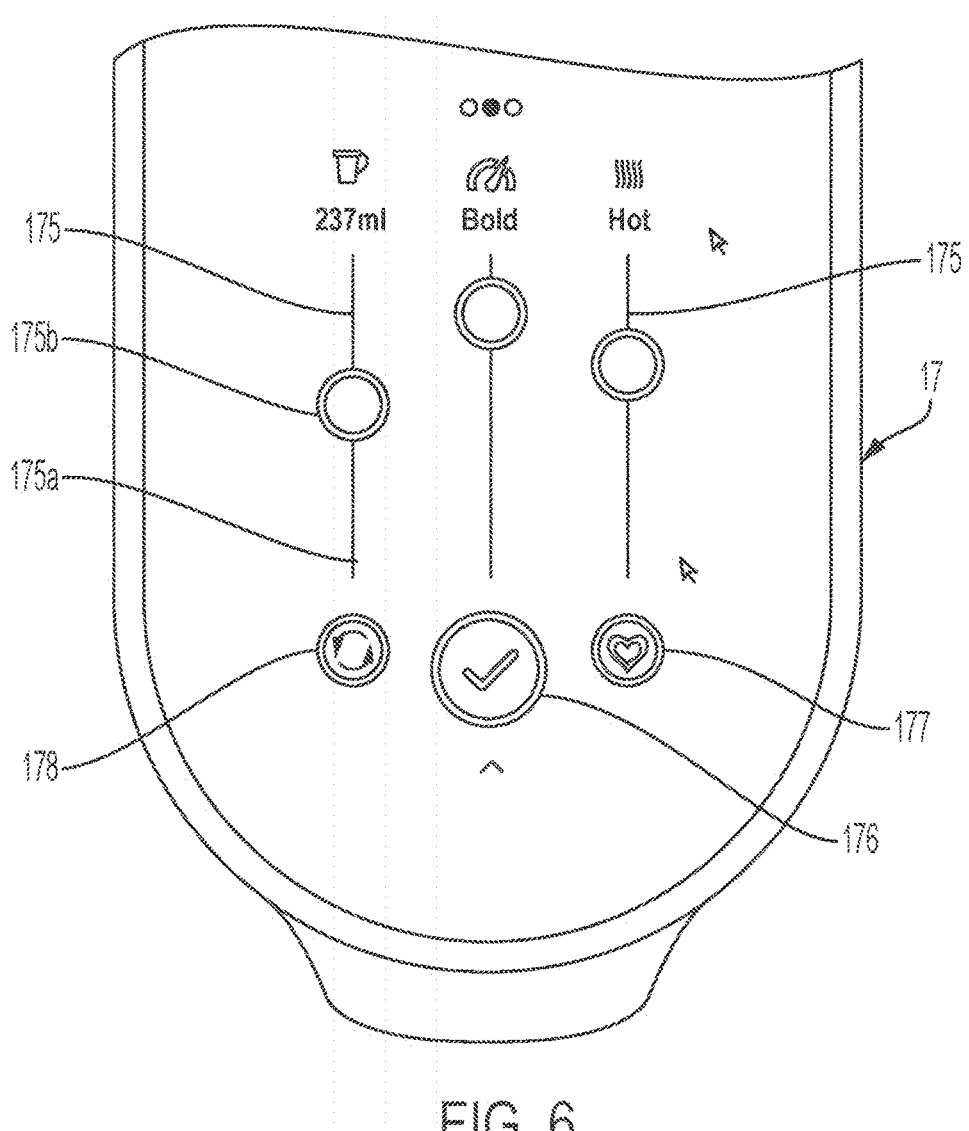
FIG. 6 is a view of a user interface including a user-adjustable indication for three brew parameters.
Figure 7:
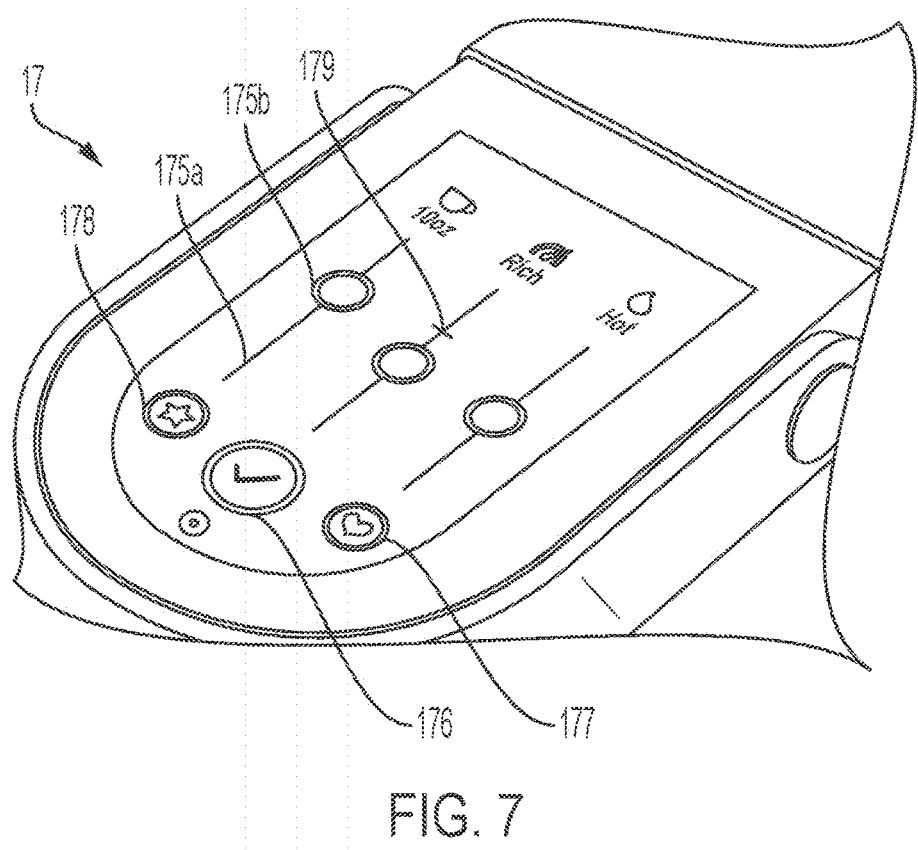
FIG. 7 is a view of the FIG. 6 user interface including an indication of a limited value for one of the user-adjustable indications.

FIG. 7 shows one illustrative embodiment in which a user-adjustable indication for a brew parameter is limited to a value that is no more than, or no less than, a limited value. In this example, the user interface 17 like that FIG. 6 has one of the adjustable brew parameters limited to be less than a limited value, i.e., the brew parameter can be set to a value by a user that is between a minimum value and a limited value that is less than a maximum value for the parameter. (Although this embodiment illustrates use of a limited value that defines a highest setting for a brew parameter, use of a limited value that sets a lowest setting for the brew parameter could be used in addition, or instead.) In FIG. 7, the middle brew parameter—a strength setting—is limited to be no more than a limited value indicated by a marking 179 (a horizontal line or hash mark) on the slider track 175a that is between minimum and maximum values for the strength parameter (in this case, at upper and lower ends of the slider track 175a). Thus, in this embodiment, the slider element 175b may be moved by a user along the slider track 175a to positions between a minimum value at a lower end of the slider track 175a and the marking 179 indicating the limited value. However, the slider element 175b cannot be moved to positions or an area on the slider track 175a that are between the marking 179 and the maximum value at the upper end of the slider track 175a. An area of the slider track 175a in which the slider element 175b is not positionable may have an appearance to indicate the lack of adjustability, e.g., the track 175a line may be dashed, colored red or otherwise have a different appearance than other portions of the track 175a. As noted above, the limited value for the brew parameter may be determined in different ways, such as based on an identified characteristic of a capsule 1 held by the beverage forming station 11. For example, different beverage strengths may be implemented by the controller 16 by adjusting a time over which water is delivered to the forming station, e.g., higher strength settings may employ a longer time over which water is delivered to a capsule 1 as compared to lower strength settings. One way to extend a time over which water is delivered is to deliver water in pulses separated by periods during which no water is delivered; another way is to slow a flow rate of water delivered continuously to the capsule 1. Certain beverage types may require a limit on a strength setting used with the capsule 1, e.g., because strength settings over a limited value may form a beverage that has an unsuitably strong taste or may involve delivery of water to the capsule that cannot properly dissolve materials in the capsule 1.

While a limit on a brew parameter may be determined based on a characteristic of a capsule that is read from a indicia on a capsule, other approaches are possible. For example, a user may identify a type of beverage or other capsule characteristic to the beverage machine 100, e.g., via a user interface 17, a user may indicate that a "hot chocolate" beverage is to be formed. Based on this information, the controller 16 may suitably define a limited value for one or more brew parameters, whether strength, volume, temperature or other. Also, a limit for a brew parameter may be determined based on information apart from a characteristic of a capsule 1. For example, limits on one or more brew parameters may be determined based on a user's identity, capabilities of a machine 100, a capacity of a cup or other container 2 to receive a beverage, etc. In some cases, if a user under a certain age is identified as using the machine 100 to make a beverage, a beverage temperature or other parameter may be limited to be no more than a limited value. This may help reduce the chance that certain users may drink a beverage that is too hot. In other cases, if a machine 100 has only, say, 10 ounces of liquid to form a beverage, the controller 16 may establish a limit for the beverage volume parameter to be no more than 8 or 10 ounces. As yet another example, if the controller 16 senses that a user's cup 2 intended to receive a beverage has a maximum capacity of 10 ounces or is made of a material unsuitable to receive a beverage over a particular temperature, the controller 16 may establish a limit for beverage volume and/or temperature that is suitable to the capacities of the cup 2.

Figure 5:
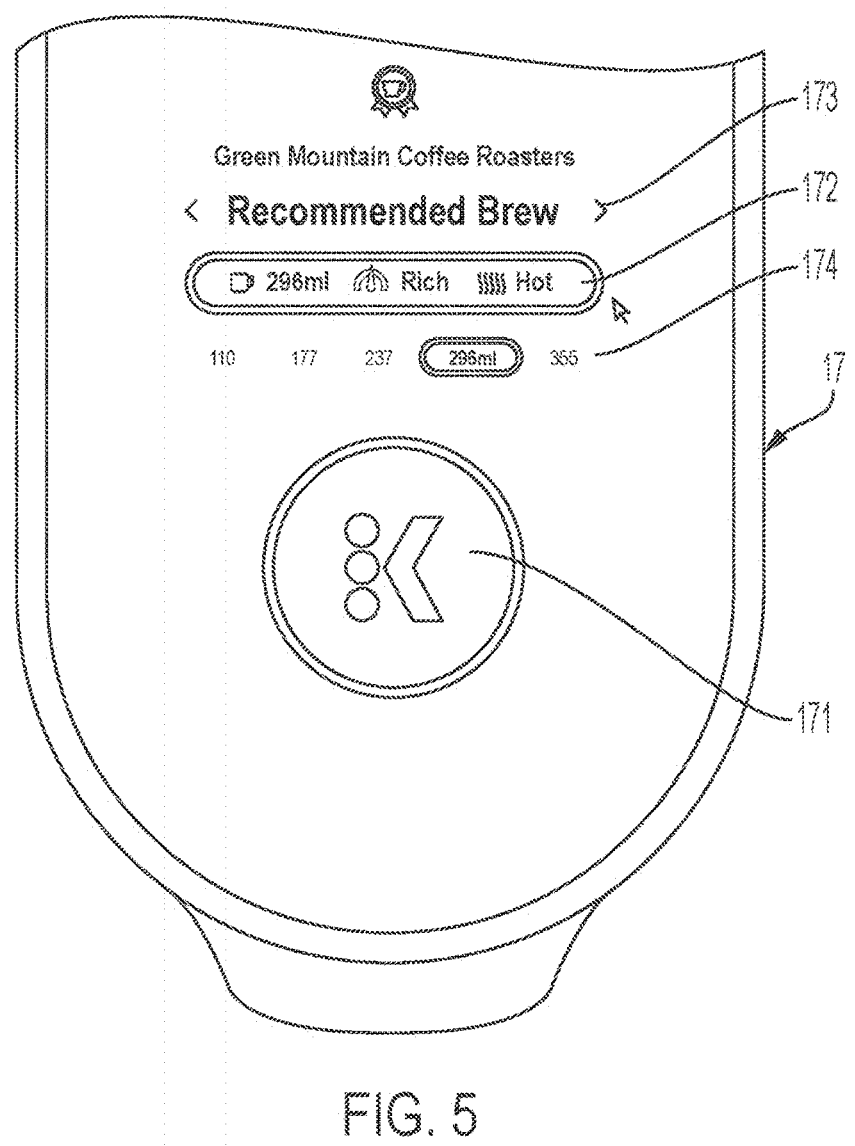
FIG. 5 is a view of a user interface including brew parameters for a set of default parameter settings.
Figure 8:
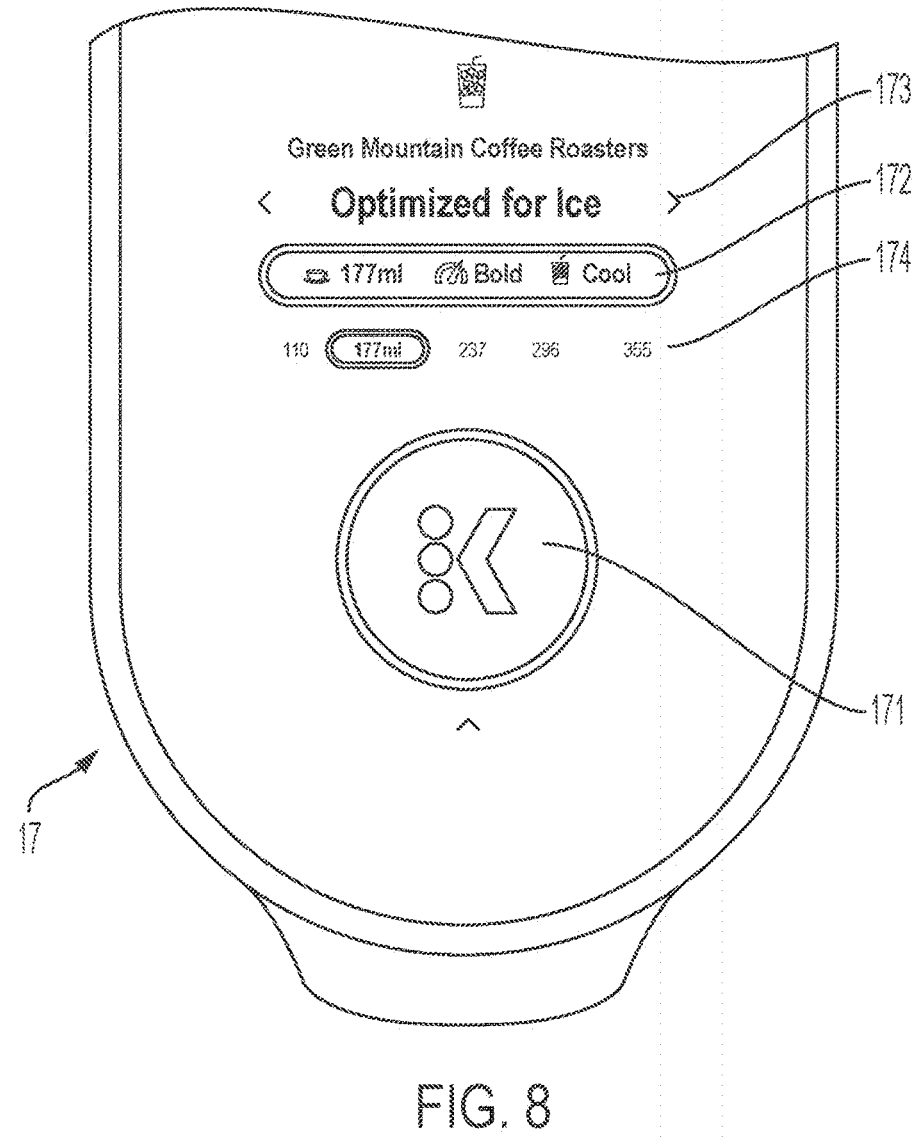
FIG. 8 is a view of a user interface including an alternate set of brew parameters selectable by a user.

As mentioned above, a user may select between multiple predetermined sets of brew parameter settings by interacting with the parameter set menu 173 in FIG. 5. As an example, FIG. 8 shows another brew parameter set labeled "Optimized for Ice" which is selectable by pressing the "<" or ">" buttons in the parameter set menu 173. Pressing the "<" or ">" buttons scrolls to different parameter sets, and in response the brew parameters settings menu 172 changes as necessary to indicate the corresponding brew parameter settings. In this example, if a user wishes to brew a coffee or other beverage over ice, the "Optimized for Ice" parameter set may be suitable, e.g., because the dispensed beverage has a relatively small volume, high strength and cool temperature which may provide a desired beverage when mixed with ice. If a user wishes to adjust one or more of the brew parameters, the user may press the brew parameter settings menu 172 to cause the user interface 17 to display a user-adjustable indication for brew parameters like that in FIG. 6.

Figure 9:
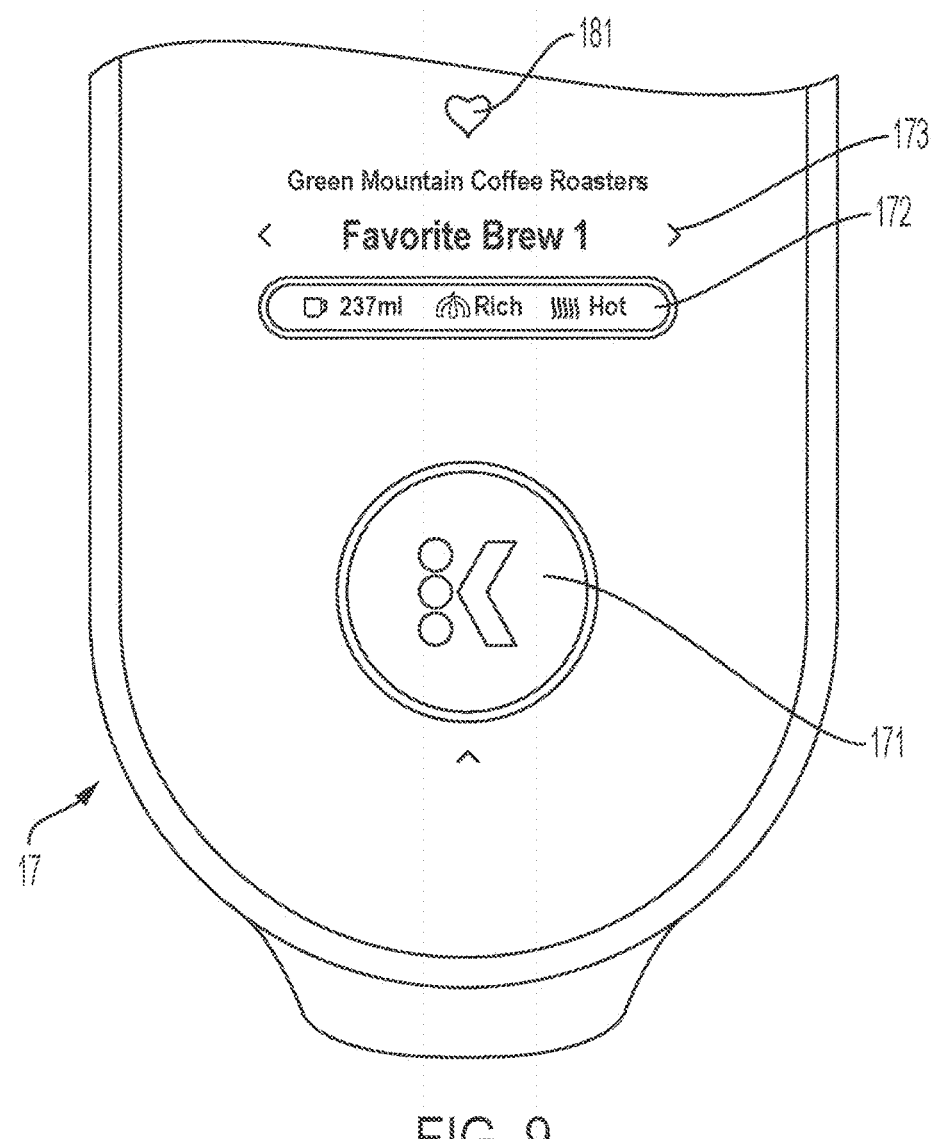
FIG. 9 shows a view of a user interface including a user-defined set of brew parameters.
Figure 10:
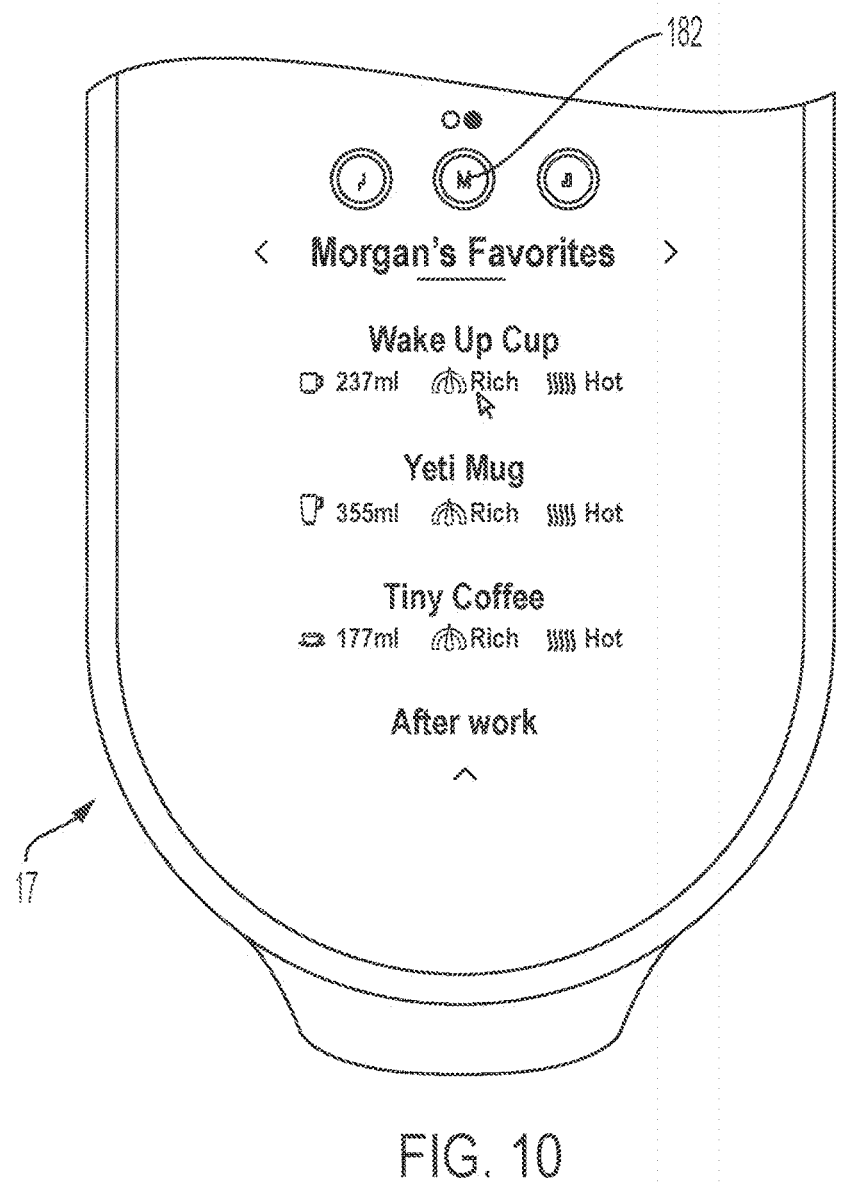
FIG. 10 shows a view of a user interface including multiple sets of user-defined brew parameters.

FIG. 9 shows another brew parameter set labeled "Favorite Brew 1" which can be accessed by pressing the "<" or ">" buttons of the parameter set menu 173. Whereas "Recommended Brew" and "Optimized for Ice" brew parameter sets are predefined in the system 100, a "favorites" set of brew parameters may be defined by a user and stored for later access and use. For example, a user may adjust brew parameter settings using an interface like that in FIG. 6 and then press the "favorites" button 177 to cause the adjusted brew parameter settings to be stored as a favorite set. The controller 16 may allow a user to name the favorite brew parameter set or may automatically label the stored favorite parameter set, e.g., as "Favorite Brew 1" followed by "Favorite Brew 2", etc. A user may also access stored favorite sets of brew parameters by pressing a favorites button 181 on FIG. 9, which in this case is indicated by a "heart." This may cause the controller 16 to have the user interface 17 display a scrollable list of stored favorites brew settings like that in FIG. 10. Favorite sets of brew parameters may be organized by user, e.g., FIG. 10 shows favorites brew parameter sets for a user "Morgan." Favorite sets of brew parameter for other users may be accessed, e.g., by pressing a corresponding user button 182. If a user wishes to use a particular favorite set of brew parameters, the user can touch or otherwise select one of the displayed sets, which causes the controller 16 to employ the selected brew parameters and display an arrangement like that in FIG. 9, although the label for the selected favorite set of brew parameters and corresponding parameters will be displayed in the parameter set menu 173 and label in the brew parameter settings menu 172.

Note that while the functionality of the user interface 17 discussed above is implemented on a beverage machine 100, the same or similar functionality may be implemented on another device, such as a user's smartphone, tablet or other device. As an example, an application operating on a user's smartphone may provide information and receive commands from a user in a same or similar way as that described above so that a user can control operation of a beverage machine 100. Thus, a user may select between multiple stored sets of brew parameters, adjust one or more brew parameters using a slider-type function or other arrangement (including optional limits on brew parameter adjustment), and cause a beverage machine 100 to dispense a beverage using the adjusted parameters via the smartphone or other remote device. The smartphone or other remote device may communicate directly with the controller 16 of the beverage machine 100, e.g., via a local network, or indirectly with the controller 16, e.g., via a remote server or other device and a network such as the Internet. In some embodiments, adjustment of a brew parameter on a user device, e.g., using a display like that in FIG. 6, may cause a corresponding change in a display on the beverage machine 100, e.g., on the user interface 17.

Figure 11:
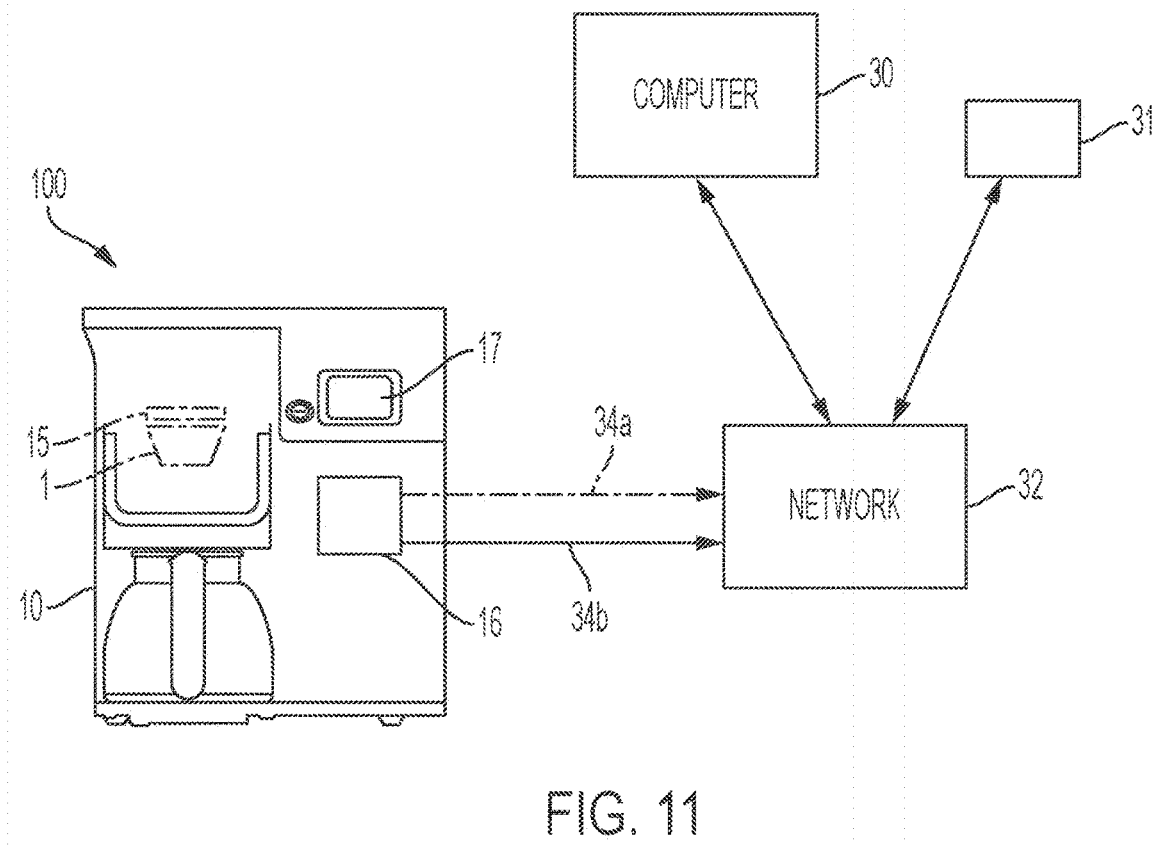
FIG. 11 is a schematic diagram of a beverage machine connected to a remote computer and/or user device via a network in an illustrative embodiment.

FIG. 11 illustrates an illustrative arrangement by which a beverage machine 100 may communicate with a remote computer 30 (such as a computer server operated by a manufacturer of the machine 100) and/or a user device 31 (such as a smartphone) via a network 32. In some embodiments, the controller 16, remote computer 30 and/or user device 31 includes a communications interface arranged to receive and send information with respect to the machine 100, such as brew parameter information, operating instructions, messages for display to a user, capsule image data (e.g., undecoded capsule image data), etc. In some embodiments, the beverage machine 100 is configured to capture and send beverage preparation parameters to the remote computer 30 and/or user device 31 (e.g., via the controller 16), e.g., capsule indicia 7 data and beverage preparation parameters may be sent before, during or after a beverage is dispensed. Sending such information before dispensing may allow a user and/or remote server to make adjustments or recommendations for adjustments to brew parameters before dispensing. Sending such information during or after dispensing may allow the user and/or remote server to track capsule use, determine when beverage are dispensed and using which brew parameters, etc., and thus may enable the user and/or server to enhance the overall beverage experience. In some embodiments, the beverage preparation parameters recorded and/or sent by the beverage machine include the day of the week, the time of day, the size (e.g., volume) of beverage prepared, the temperature of the water, the strength of beverage formed (e.g., strong, medium, weak), the type of beverage formed, and/or other apparatus settings (e.g., power settings, whether air was introduced into the precursor liquid during beverage formation, a carbonation level of the beverage, a location of the beverage machine during preparation of the beverage or an identity of a user associated with preparation of the beverage). The controller 16 may be configured to decode the capsule indicia 7, e.g., to allow sending of characteristics of a capsule to a user or remote server. As will be appreciated, in such embodiments, the imaging device may include an image decoder (e.g., a barcode reader, optical character recognition software, and/or other image analysis capability). The beverage machine may 100 have one-directional communication with the remote computer 30 and/or user device 31 via the network 32. That is, the machine 100 may communicate with the remote computer 30 and/or user device 31 but may not receive communications therefrom. The remote computer 30 and/or user device 31 may have bi-directional communications ability with the machine 100, and/or other devices connected to the network 30, e.g., the computer 30 may be arranged to send communications directly to a user device 31 (e.g., to a user's telephone or e-mail). The beverage machine 100 also may be arranged to have bi-directional communication with the remote computer 30 and/or user device 31 (e.g., sending communications to and receiving communications from the remote computer). For example, the remote computer may send information to the machine 100 regarding a message that is displayed on a user interface 17 on the machine 100. In other embodiments, the remote server 30 may send decoded indicia (e.g., a beverage preparation parameter) back to the machine 100, which may then use the parameter to prepare the beverage. The beverage machine 100 may be connected to the network 32 via a wireless connection 34a and/or a wired connection 34b (e.g., via an Ethernet cable).

The remote computer 30 may be configured to track the number of capsules consumed by the user or machine 100 (e.g., the number of capsule used and/or the types of capsules used). In some embodiments, the remote computer may track consumption by tracking capsule and/or brew parameter information that the beverage machine sends to the computer. The remote computer may be configured to determine a user's need for capsule replenishment based on the user's consumption and on past purchase history. In some embodiments, the remote computer determines when a user is in need of capsule replenishment by determining when the user's current supply of capsules falls below a threshold amount (e.g., less than a week's worth of capsules). In some embodiments, the remote computer determines the user's current capsule supply (e.g., a remaining number of unused capsules) by comparing the number of capsules purchased by the consumer (e.g., purchased from the beverage machine manufacturer, such as via an e-commerce website) and the number of capsules consumed by the user. The remote computer also may determine whether the number of remaining capsules has fallen below the threshold amount. The remote computer may run an algorithm to make such a calculation.

Figure 12:
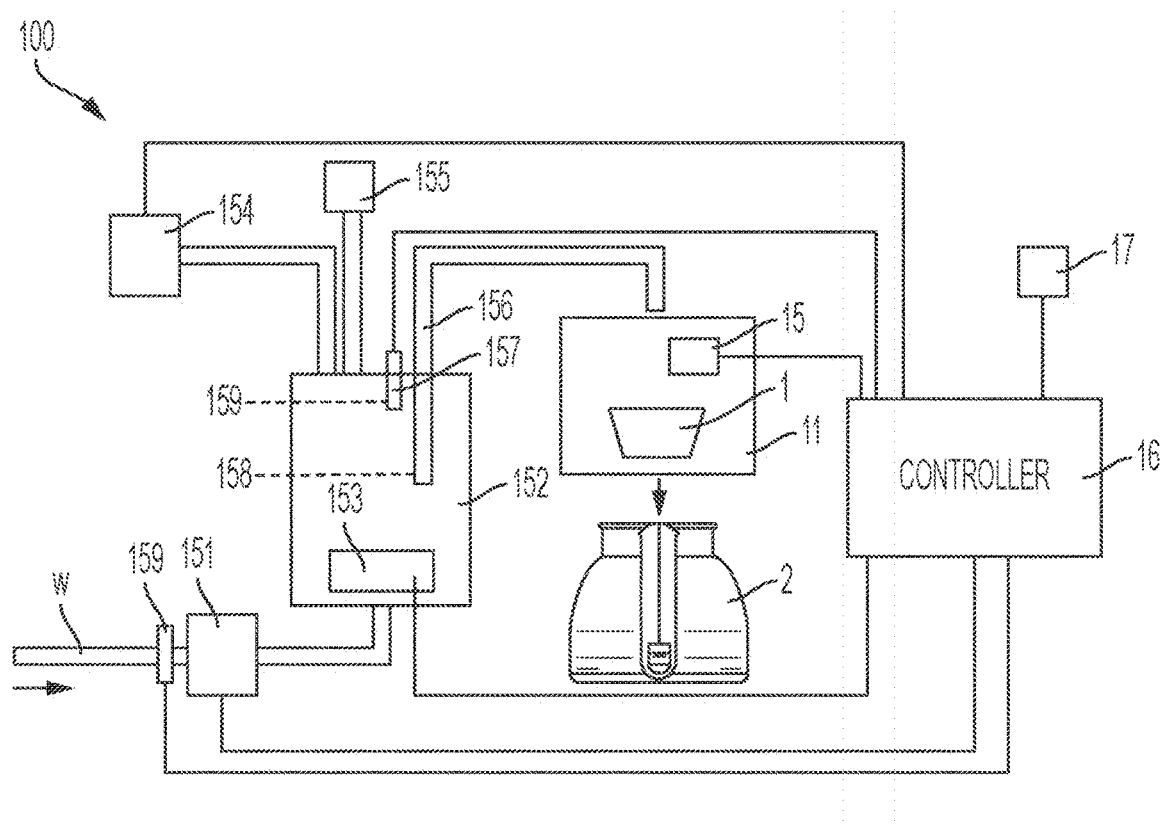
FIG. 12 is a schematic diagram of components of a beverage machine in an illustrative embodiment.

FIG. 12 shows a schematic block diagram of various components that may be included in a beverage machine 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply to mix with a beverage material at a beverage forming station 11. The beverage material (such as coffee grounds, tea leaves, a powdered drink mix, etc.) may be provided in a capsule 1, or not, and beverage produced by mixing the liquid with the beverage material may be dispensed into the container 2 via a beverage outlet.

The liquid supply in this embodiment controls the volume of liquid provided to the beverage forming station 11 by filling a tank to a liquid dispense level 159 and then pressurizing the tank 152 by way of an air pump 154 so that liquid in the tank 152 is forced out of the conduit 156 to the beverage forming station 11. The volume of liquid delivered to the beverage forming station 11 is equal to the volume in the tank 152 between the liquid delivery level 159 and a post-delivery level 158 at a bottom of the conduit 156 in the tank 152. Since there is one delivery level 159 in this embodiment, one volume can be provided to the beverage forming station 11. However, two or more delivery levels may be used.

In this embodiment, the liquid supply provides liquid to the tank 152 via a valve 151 that is coupled to a source W. The source W may have any suitable arrangement, e.g., may provide liquid from a removable or fixed storage tank, a mains water supply or other source. Thus, in some cases, the liquid provided to the tank 152 may vary in temperature by a wide degree depending on various factors, such as time of year, a temperature of a room in which the machine 100 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the dispense level 159. In response to the level sensor 157 detecting liquid at the sensor 157, the control circuit 16 may close the valve 151. Of course, other arrangements are possible, such using a pump to move liquid from a storage reservoir to the tank 152.

Although in this embodiment the liquid level sensor includes a conductive probe capable of contacting liquid in the tank 152 and providing a signal (e.g., a resistance change) indicative of liquid being present at respective dispense level 159 in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at a dispense level (e.g., complete filling of the tank 152 may coincide with a sharp rise in pressure in the tank 152), while a conductive probe may be used to detect liquid at the other dispense level 159.

Further, a liquid level sensor need not be used to fill the tank to the dispense level 159. Instead, other techniques may be used to suitably fill the tank 152, such as opening the valve 151 for a defined period of time that is found to correspond to approximate filling of the tank 152 to the desired level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the dispense level 159 may depend on the technique used to provide liquid to the tank. For example, control of a volume of liquid provided to fill the tank 152 to the dispense level 159 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Also, the tank 152 may be arranged as an inline or continuous flow heater that has a relatively small volume, e.g., a tube with associated heating element to heat liquid in the tube. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply that heat, cool, carbonate or otherwise condition liquid supplied to the beverage forming station 11 are referred to as a "liquid conditioner.")

In this embodiment, liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 between the dispense level 159 and the bottom end of the conduit 156. Again, liquid may be caused to flow from the tank 152 to the beverage forming station 11 in other ways. For example, a pump may be used to pump liquid from the tank 152 to the forming station 11, a pump could force liquid into the tank 152 which causes liquid in the tank to move to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a capsule 1 or not. Alternately, the beverage forming station 11 may function simply as an outlet for heated, cooled or otherwise conditioned water or other liquid, e.g., where a beverage medium is contained in the container 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces (such as a user interface 17), communication buses or other links, a display, switches, relays, triacs, or other components necessary to perform desired input/output or other functions. As discussed above, the user interface 17 may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage forming system comprising:
a liquid supply arranged to provide a liquid for forming a beverage;
a beverage forming station arranged to hold a beverage material for mixing with the liquid to form a beverage;

a liquid conditioner arranged to heat or cool the liquid that is provided to the beverage forming station;
a control circuit arranged to control the liquid supply and the liquid conditioner to operate automatically according to one or more brew parameters during a dispensing operation to deliver heated or cooled liquid to the beverage forming station to form the beverage, the control circuit including a user interface arranged to provide a user-adjustable indication of at least one brew parameter and to receive a command from a user to adjust the at least one brew parameter, and the control circuit being adapted to limit the command from the user to adjust the at least one brew parameter to be between a minimum value for the at least one brew parameter and a limited value that is below a maximum value for the at least one brew parameter, or between a limited value that is above the minimum value and the maximum value for the at least one brew parameter; and
a touch screen interface, wherein the user-adjustable indication is displayed on the touch screen interface.

2. The system of claim 1, wherein the control circuit is adapted to provide an indication of the maximum value or the minimum value for the at least one brew parameter along with an indication of the limited value.

3. The system of claim 2, wherein the beverage forming station is adapted to receive a beverage capsule containing the beverage material, and the control circuit is adapted to identify at least one characteristic of the beverage capsule received by the beverage forming station and determine the limited value based on the at least one characteristic of the beverage capsule.

4. The system of claim 3, wherein the at least one characteristic of the beverage capsule is one of a type of beverage to be formed using the beverage capsule, authentication information associated with the beverage capsule, and information regarding the beverage material in the beverage capsule.

5. The system of claim 2, wherein the user-adjustable indication includes a slider track extending between the maximum and minimum values for the at least one brew parameter and a slider element movable along the slider track where a position of the slider element on the slider track indicates a set value for the at least one brew parameter.

6. The system of claim 5, wherein the indication of the limited value includes a marking along the slider track between the maximum and minimum values, the slider element not being movable to an area between the marking and the maximum value or between the marking and the minimum value.

7. The system of claim 1, wherein the at least one brew parameter includes a volume of beverage to be dispensed, a temperature of the beverage, a strength of the beverage, an amount of whipping of the beverage, a time period over which the beverage is dispensed, a speed at which the beverage is dispensed, a flow rate at which liquid is delivered to the beverage forming station, a pressure of liquid delivered to the beverage forming station, and an amount of air or steam delivered to the beverage forming station.

8. The system of claim 1, wherein the beverage forming station is adapted to receive a beverage capsule containing the beverage material, and the control circuit is adapted to identify at least one characteristic of the beverage capsule received by the beverage forming station and determine the limited value based on the at least one characteristic of the beverage capsule.

9. The system of claim 8, wherein the control circuit is adapted to determine a default setting for the at least one brew parameter based on the at least one characteristic of the beverage capsule, and wherein the user-adjustable indication includes a display of the default setting for the at least one brew parameter.

10. The system of claim 9, wherein the user-adjustable indication includes a slider track extending between the maximum and minimum values for the at least one brew parameter and a slider element movable along the slider track where a position of the slider element on the slider track indicates a set value for the at least one brew parameter, the slider element being located on the slider track in a position corresponding to the default setting for the at least one brew parameter.

11. The system of claim 10, wherein the indication of the limited value includes a marking along the slider track between the maximum and minimum values, the slider element being movable by a user from the position corresponding to the default setting but not being movable to an area between the marking and the maximum value or between the marking and the minimum value.

12. The system of claim 1, wherein the user interface includes a user-adjustable indication for at least two brew parameters.

13. The system of claim 12, wherein the at least two brew parameters includes a volume of beverage to be dispensed and a temperature of the beverage.

14. The system of claim 12, wherein the at least two brew parameters includes a volume of beverage to be dispensed, and a strength of the beverage.

15. The system of claim 12, wherein the control circuit is adapted to determine a default setting for each of the at least two brew parameters, and wherein the user-adjustable indications includes a display of the default setting for each of the at least two brew parameters.

16. The system of claim 12, wherein the beverage forming station is adapted to receive a beverage capsule containing the beverage material, and the control circuit is adapted to identify at least one characteristic of the beverage capsule received by the beverage forming station and determine limited values for each of the at least two brew parameters based on the at least one characteristic of the beverage capsule.

17. The system of claim 16, wherein the control circuit is adapted to determine a default setting for each of the at least two brew parameters, and wherein the user-adjustable indications for each of the at least two brew parameters includes a display of the default setting and the limited values for each of the at least two brew parameters.

* * * * *